March 27, 1956     C. F. MARTIN     2,739,405
FISH LURE
Filed July 16, 1954
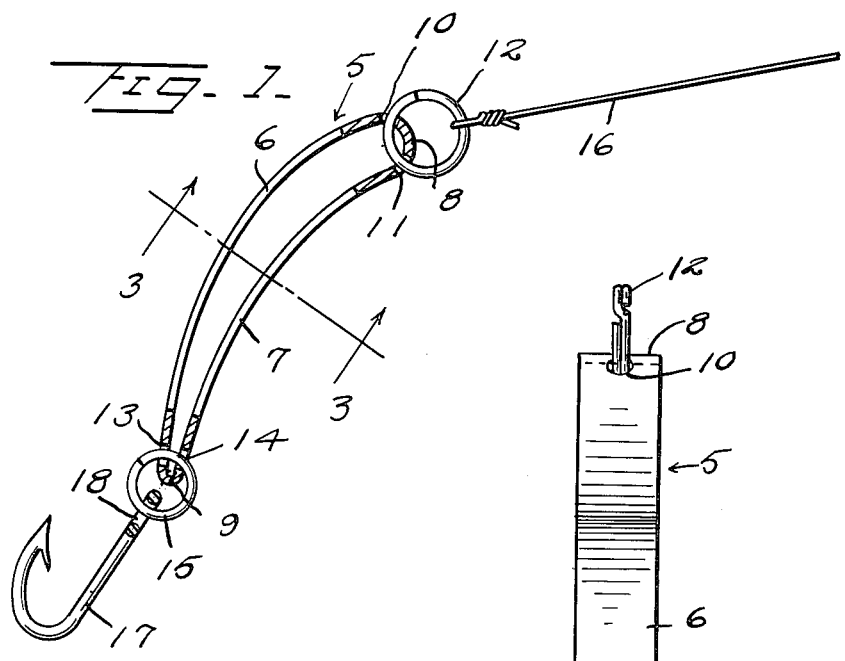
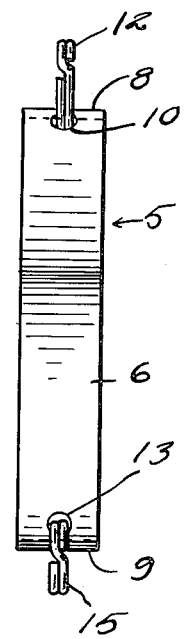
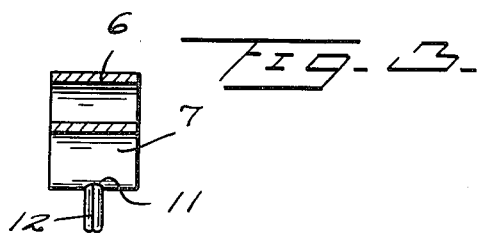
INVENTOR
C. F. Martin
BY John N. Randolph
ATTORNEY

United States Patent Office 2,739,405
Patented Mar. 27, 1956

2,739,405

FISH LURE

Cecil F. Martin, Lordsburg, N. Mex.

Application July 16, 1954, Serial No. 443,911

3 Claims. (Cl. 43—42.06)

This invention relates to a novel fish lure for game fish of extremely simple construction yet which due to its unique construction and shape accomplishes an unusual action in the water which very realistically simulates the movement of live minnows.

Another object of the invention is to provide a novel lure which due to its unique construction will produce an unusual action in the water due to the movement of water within the lure body or more exactly, the movement of the lure body relatively to the water disposed there within and which is expelled therefrom by water pressure created in a part of the lure body due to the movement of the lure body.

Various other objects and advantages of the invention will hereinafter become more fully apparent from the following description of the drawing, illustrating a presently preferred embodiment thereof, and wherein:

Figure 1 is a side elevational view of the lure, portions being shown broken away;

Figure 2 is a top plan view of the lure, and

Figure 3 is a cross sectional view thereof, taken substantially along a plane as indicated by the line 3—3 of Figure 1.

Referring more specifically to the drawing, the improved lure comprising the invention is designated generally 5 and is composed of a single elongated endless loop member which may be formed of any suitable material, preferably metal or other nonbuoyant material. The elongated endless loop forming the lure 5, if formed of a metal, is preferably of a material which is rust and corrosion resistant and may contain a coating of chrome or nickel or any other suitable material to provide a bright, shining and reflective surface, or may be of any desired color. Likewise, the loop forming the lure 5 may present a bronze or brass surface. The elongated loop forming the lure 5 includes an outer or top plate or loop part 6 and an inner or lower plate or loop part 7. The plates 6 and 7 are integrally joined at one end of the lure 5 by a rounded forward end 8, forming the head or leading portion of the lure. The plates 6 and 7 are longitudinally bowed from end-to-end thereof in the same direction, the upper plate 6 being bowed away from the lower plate 7 and said lower plate being bowed toward the upper plate. Accordingly, the upper side or outer side of the upper plate 6 is convexly bowed longitudinally and the under and outer side of the lower plate 7 is concavely bowed longitudinally. Additionally, the plates 6 and 7 are disposed in converging relation relative to one another from the head end 8 of the lure toward the opposite tail end 9 thereof and the plates 6 and 7 are disposed relatively close to one another adjacent the tail end 9 of the lure and are spaced a substantially greater distance apart at the head end 8. The tail end 9 of the lure is formed by a rounded end part of the loop, the thickness of which as measured in a direction between the loop parts 6 and 7 is substantially less than the thickness of the head part 8, measured in the same direction. The endless loop or strip forming the lure 5 is preferably of uniform width throughout, as illustrated in Figures 2 and 3, and is of sufficient rigidity to maintain its shape as illustrated in Figure 1 under all normal conditions of use.

The loop parts 6 and 7, at their forward ends which merge with the rounded head 8, are provided with openings 10 and 11, respectively. A split ring 12 is connected to the leading end or head portion of the lure 5 through the openings 10 and 11. The plates 6 and 7, adjacent the tail 9 of the lure, are provided with aligned openings 13 and 14 through which a second split ring 15 extends and is thereby attached to the lure. The openings 10, 11, 13 and 14 are preferably disposed midway of the side edges of the loop forming the lure body, as illustrated in Figures 2 and 3. One end of a fishing line or leader 16 is attached to the leading end of the lure 5 by being secured to the attaching element or ring 12 and a fishhook 17 is detachably connected to and projects from the tail end 9 of the lure 5 by being connected to the attaching element or ring 15, which extends loosely through the eye 18 in the shank end of said fishhook 17.

As previously stated, the lure 5 is nonbuoyant, being formed of a material having a specific gravity greater than the specific gravity of water, so that the lure constitutes a subsurface lure. When the lure 5 is permitted to sink in the water it will accomplish a fluttering or irregular movement due to the water impinging against the concave under sides of the top and bottom lure parts 6 and 7 and which is very enticing to and will attract fish. When the lure 5 is drawn slowly through the water, from left to right as seen in Figure 1, with the head end 8 as the leading end thereof, as by being slowly trolled or retrieved, the lure will be inclined downwardly and rearwardly from its head end 8 to its tail end 9, as illustrated in Figure 1, or to either a greater or a lesser extent, depending upon the speed of movement of the lure 5. During such movement of the lure 5 when being pulled or drawn by the line or leader 16, the lure will execute a zigzag path, darting laterally in one direction and then the other. This results from the fact that the water between the lure parts 6 and 7 is normally relatively inert as compared to the lure 5 and accordingly as the lure 5 moves in a forward direction, as previously described, from left to right of Figure 1, this water between the lure parts 6 and 7 is forced toward the tail end 9 of the lure and in so moving a pressure is built up within the rear part of the lure. The water in escaping from the open sides of the lure as defined by the parts 6 and 7 and around the side edges of the upper lure part 6, primarily, will produce a vigorous side to side movement of the lure, as previously mentioned. This zigzag or lateral darting movement, together with conflicting currents caused by the longitudinal curved surfaces of the portions 6 and 7 and the fact that said portions are disposed in rearwardly converging relation to one another, in combination with the water impinging against the under or outer side of the bottom lure part 7, will produce conflicting water pressures and currents around the lure so that the movement of the lure will very realistically simulate the swimming movement of a minnow, especially when attempting to escape from a game fish.

Various modifications and changes are contemplated and may obviously be resorted to, without departing from the spirit or scope of the invention as hereinafter defined by the appended claims.

I claim as my invention:

1. A fish lure comprising narrow upper and lower complementary curved plates integrally joined at their leading and trailing edges, the leading portion being arcuately curved and the distance between the plates progressively increasing from the trailing edges toward the leading edges, said plates being of substantially equal and constant width and the lure being open at its sides, and line and hook attaching means connected to the lure adjacent the leading and trailing edges, respectively.

2. A fish lure as in claim 1, the width of said plate being greater than the distance between the plates at the leading portion of the lure.

3. A fish lure as in claim 1, said upper and lower plates being upwardly bowed from end-to-end thereof.

References Cited in the file of this patent

UNITED STATES PATENTS

| | | |
|---|---|---|
| D. 139,655 | Jorgensen | Dec. 5, 1944 |
| 1,015,674 | Geest | Jan. 23, 1912 |
| 1,082,473 | Callahan | Dec. 23, 1913 |
| 1,362,586 | Ackerman | Dec. 21, 1920 |
| 2,071,012 | Adams | Feb. 16, 1937 |
| 2,176,803 | Roselle | Oct. 17, 1939 |
| 2,392,116 | Blumstein | Jan. 1, 1946 |
| 2,569,465 | Farr | Oct. 2, 1951 |
| 2,632,276 | Hale | Mar. 24, 1953 |